United States Patent
Yamada et al.

(10) Patent No.: US 10,024,605 B2
(45) Date of Patent: Jul. 17, 2018

(54) HEAT RECEIVING TILE FORMED OF CARBON FIBER COMPOSITE MATERIAL AND METHOD OF MANUFACTURING THE SAME

(71) Applicant: KAWASAKI JUKOGYO KABUSHIKI KAISHA, Kobe-shi, Hyogo (JP)

(72) Inventors: Hirokazu Yamada, Naka-gun (JP); Kouji Satou, Amagasaki (JP); Daigo Tsuru, Naka (JP); Shinji Sakurai, Naka (JP); Shigetoshi Nakamura, Naka (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 0 days.

(21) Appl. No.: 15/117,009

(22) PCT Filed: Feb. 5, 2015

(86) PCT No.: PCT/JP2015/053212
§ 371 (c)(1),
(2) Date: Aug. 5, 2016

(87) PCT Pub. No.: WO2015/119187
PCT Pub. Date: Aug. 13, 2015

(65) Prior Publication Data
US 2017/0167802 A1    Jun. 15, 2017

(30) Foreign Application Priority Data
Feb. 5, 2014   (JP) .................. 2014-020421

(51) Int. Cl.
*F28D 19/02*   (2006.01)
*F28D 20/00*   (2006.01)

(52) U.S. Cl.
CPC ......... *F28D 20/0056* (2013.01); *F28D 20/00* (2013.01)

(58) Field of Classification Search
CPC ..... F28D 20/0056; F28D 20/00; F01M 5/002; F01M 11/02; F01D 25/18; F01D 25/28; F01D 9/02
(Continued)

(56) References Cited

U.S. PATENT DOCUMENTS

2007/0137847 A1    6/2007  Schedler et al.
2007/0246517 A1*  10/2007  Schedler .................. G21B 1/13
                                                228/194

(Continued)

FOREIGN PATENT DOCUMENTS

JP    H02-35097 U    3/1990
JP    H07-167972 A   7/1995
(Continued)

OTHER PUBLICATIONS

Apr. 28, 2015 International Search Report issued in International Patent Application No. PCT/JP2015/053212.
(Continued)

*Primary Examiner* — Davis Hwu
(74) *Attorney, Agent, or Firm* — Oliff PLC (57) ABSTRACT

This heat receiving tile formed of CFC is provided with a heat receiving block formed of a carbon fiber composite material and having a through hole, a cooling pipe inserted through the through hole of the heat receiving block, a buffer material provided to an outer periphery of the cooling pipe, a first brazing portion joining an inner surface of the through hole with an outer surface of the buffer material, a second brazing portion joining an inner surface of the buffer material with an outer surface of the cooling pipe, and a material discontinuous portion extending from a heat receiving sur-
(Continued)

face of the heat receiving block up to the outer surface of the cooling pipe over a full length of the heat receiving block in an axis direction of the through hole.

11 Claims, 5 Drawing Sheets

(58) Field of Classification Search
USPC .......................................................... 165/53
See application file for complete search history.

(56) References Cited

U.S. PATENT DOCUMENTS

| | | |
|---|---|---|
| 2008/0032530 A1 | 2/2008 | Friedrich et al. |
| 2011/0132973 A1 | 6/2011 | Uchiyama et al. |

FOREIGN PATENT DOCUMENTS

| | | |
|---|---|---|
| JP | H08-506315 A | 7/1996 |
| JP | 2007-155737 A | 6/2007 |
| JP | 2008-533492 A | 8/2008 |
| JP | 2011-122883 A | 6/2011 |
| JP | 2014-224730 A | 12/2014 |

OTHER PUBLICATIONS

Aug. 9, 2016 International Preliminary Report on Patentability issued in International Patent Application No. PCT/JP2015/053212.
T. Hirai. "Engineering of In-Vessel Components for Iter". PFMC-13 Workshop/FEMaS-1 Conference Tutorial Sessions, May 2011.

\* cited by examiner

HEAT RECEIVING TILE FORMED OF CARBON FIBER COMPOSITE MATERIAL AND METHOD OF MANUFACTURING THE SAME

TECHNICAL FIELD

The present invention relates to a heat receiving tile formed of carbon fiber composite material used for a heat receiving equipment under a high heat load such as a first wall of a nuclear fusion device, and a method of manufacturing the same.

BACKGROUND ART

A first wall in a nuclear fusion device refers to equipment in general which directly face plasma generated in a reactor, specifically including a divertor, a blanket surface, a limiter, or the like. As the first wall directly faces plasma, it receives severe heat and particle load from high temperature plasma. Therefore, the first wall is required to maintain its structural integrity and serve as a shielding body against plasma for the surrounding structure without causing negative effects to the plasma.

Therefore, the first wall is required to have a function of enduring a high heat load due to high temperature plasma and removing the heat. In order to achieve such a heat removing function under the high heat load, it is necessary to configure the first wall by a material with high heat conductivity.

Figure 5:
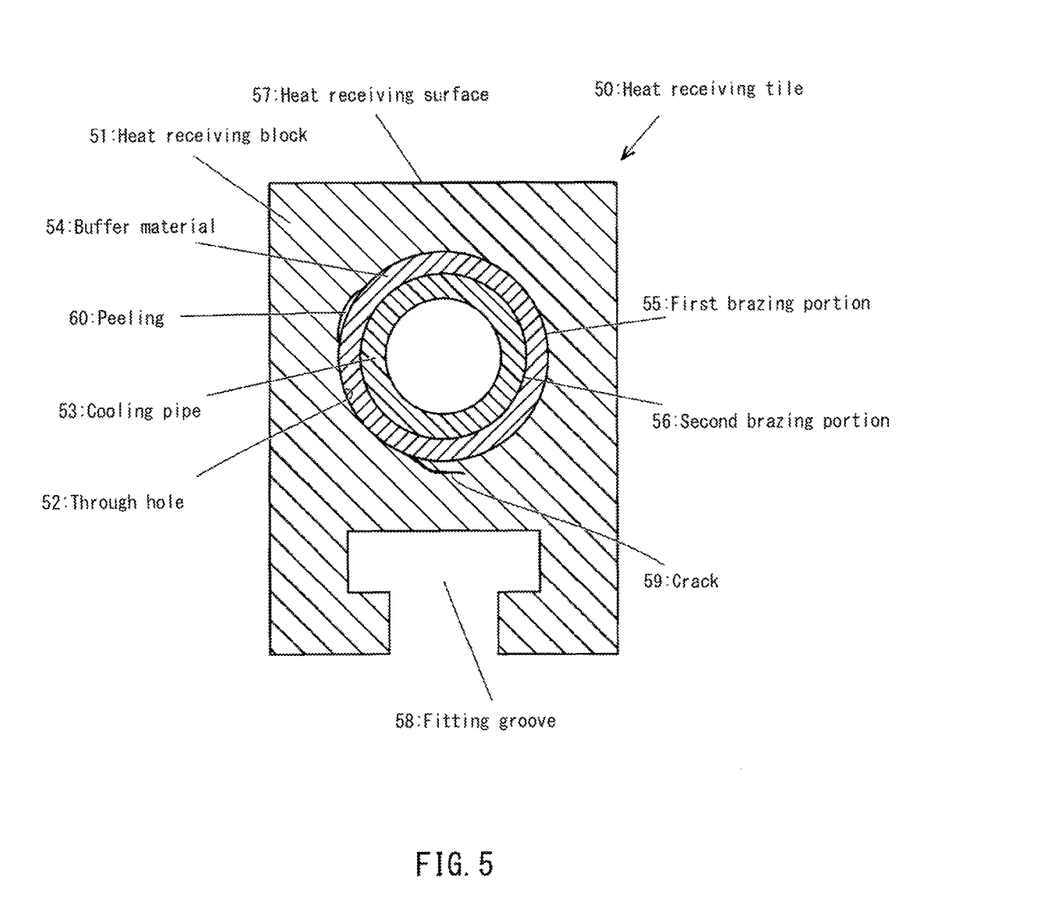
FIG. 5 is a longitudinal section view of an example of a conventional heat receiving tile formed of carbon fiber composite material used for a divertor in a nuclear fusion devise, illustrating a conventional problem.

FIG. 5 illustrates an example of a conventional heat receiving tile formed of carbon fiber composite material used for a divertor of a nuclear fusion device, and in particular, illustrates a heat receiving tile suitable for a divertor of a Tokamak type nuclear fusion device.

The divertor of the Tokamak type nuclear fusion device receives the highest heat load in the nuclear fusion device since a kinetic energy of charged particles injected to the divertor is provided thereto as heat. Therefore, the divertor is required to have a function of enduring such a high heat load and removing the heat.

A heat receiving tile 50 of the divertor in FIG. 5 is provided with a heat receiving block 51, which is formed of a material having less negative influence on plasma, on its surface facing the plasma in order to protect a cooling structure from a sputtering due to ion radiation or a heat impact caused by plasma disruption.

The heat receiving block 51 is desired to be formed of a material having a small atomic number which has less negative influence on the plasma, since particles are emitted from the surface of the heat receiving block 51 and mixed in the plasma due to the sputtering or the like, causing decrease in plasma temperature and degradation of confinement performance. A carbon fiber composite material (CFC) is a typical example of such a material, considering heat conductivity.

In the nuclear fusion device which performs a long-term discharge, a surface temperature of a divertor exceeds a service limit temperature of component materials, going beyond heat capacity of the materials configuring the divertor. Accordingly, a through hole 52 is formed at the center of the heat receiving block 51 and a cooling pipe 53 is inserted therethrough. A cooling pipe formed of a copper alloy which has a high heat conductivity and a high strength such as chromium-zirconium copper (CuCrZr), for example is employed as the cooling pipe 53.

Upon operation of the nuclear fusion device, a cooling material such as water is passed though the inside of the cooling pipe 53 so as to forcibly remove the heat that the heat receiving block 51 received. This prevents the heat receiving block 51 from being damaged exceeding its service limit temperature.

However, there are not good in joinability between the heat receiving block 51 formed of carbon material such as CFC and the cooling pipe 52 formed of a copper alloy such as CuCrZr, and also there is a great difference in the coefficient of thermal expansion.

Accordingly, in order to efficiently conduct a heat energy received from the plasma to the cooling pipe 53 and also to absorb the difference in the coefficient of thermal expansion, a buffer material 54 formed of a cupper material such as CuW is interposed between the heat receiving block 51 and the cooling pipe 53.

The heat receiving block 51 and the buffer material 54, and the buffer material 54 and the cooling pipe 53 are metallurgically joined by brazing using a Cu—Mg based or Ti—Cu based joining material with high heat conductivity so as to reduce the resistance of heat transfer as much as possible. Namely, there is a first brazing portion 55 between the heat receiving block 51 and the buffer material 54, and there is a second brazing portion 56 between the buffer material 54 and the cooling pipe 53.

Note that a fitting groove 58, through which a rail for fixing the heat receiving tile 50 to other equipment is passed, is formed on a surface of the heat receiving block 51 opposite to a heat receiving surface 57.

Note that, the heat receiving block 51, the cooling pipe 53, and the buffer material 54 significantly differ in coefficient of thermal expansion from each other as follows: $1 \times 10^{-6}$ for the heat receiving block 51; $2 \times 10^{-5}$ for the cooling pipe 53; and $1 \times 10^{-5}$ for the buffer material 54.

Therefore, when the materials shrink in a high temperature processing during the brazing process, especially in a temperature dropping, the heat receiving block 51 and the buffer material 54 with small thermal expansion coefficient cannot follow the shrinkage of the cooling pipe 53 with large thermal expansion coefficient, and therefore defects tend to occur at joining parts between them.

As a result, a crack 59 sometimes occurs in the heat receiving block 51 near the bonding surface of the buffer material 54, and a peeling 60 sometimes occurs between the heat receiving block 51 and the buffer material 54. The occurrence of this crack 59 and peeling 60 results in the heat conductivity declining and in the cooling efficiency of the heat receiving block 51 declining.

Patent Literature 1 describes a high heat resistant structure component that a graphite portion and a metal portion are coupled to each other via a brazing layer and an intermediate layer is disposed between the metal portion and the brazing layer. Patent Literature 1 describes that this special intermediate layer absorbs the difference in thermal expansion coefficient between the different materials, enabling a solid coupling between the graphite and the metal.

The high heat resistant structure component of Patent Literature 1 could endure a heat cycle load applied during operation of the nuclear fusion device and prevent an extreme deformation and a material crack of the structure component.

However, as brazing is performed in a temperature of 850° C. to 1900° C., the component sometimes cannot endure a high temperature processing applied during a manufacturing process of the component, and therefore a yield of the product is not considered to be high.

CITATION LIST

Patent Literature

Patent Literature 1: Japanese Patent Application Publication No. H08-506315

SUMMARY OF INVENTION

Objects to be Achieved by the Invention

Accordingly, an object of the present invention is to provide a heat receiving tile formed of carbon fiber composite material used for a high heat load heat receiving equipment such as a first wall of a nuclear fusion device, the heat receiving tile formed of carbon fiber composite material not including a defect to decline a cooling efficiency such as a peeling between members configuring the heat receiving tile and a crack of the members, and a manufacturing method of the same.

Means for Achieving the Object

In order to achieve the above-mentioned object, the present invention provides a heat receiving tile formed of carbon fiber composite material used for a high heat load heat receiving equipment, comprising: a heat receiving block formed of carbon fiber composite material and having a through hole; a cooling pipe inserted through the through hole of the heat receiving block; a buffer material provided to an outer periphery of the cooling pipe; a first brazing portion joining an inner surface of the through hole with an outer surface of the buffer material; a second brazing portion joining an inner surface of the buffer material with an outer surface of the cooling pipe; and a material discontinuous portion extending from a heat receiving surface of the heat receiving block up to at least the outer surface of the buffer material over a full length of the heat receiving block in an axis direction of the through hole.

Also, it is preferable that the material discontinuous portion is defined by a pair of material surfaces opposed to each other.

Also, it is preferable that the pair of material surfaces are formed so as to be separated from each other.

Also, it is preferable that the material discontinuous portion is a slit.

Also, it is preferable that the pair of material surfaces are in contact with each other at least on a side of the heat receiving surface.

Also, it is preferable that the material discontinuous portion is formed by making a cut in the heat receiving block in a process of manufacturing the heat receiving tile.

Also, it is preferable that the cooling pipe is formed of a copper alloy material.

Also, it is preferable that the high heat load heat receiving equipment is an equipment used as a first wall of a nuclear fusion device.

Also, it is preferable that the material discontinuous portion extends from the heat receiving surface of the heat receiving block up to the outer surface of the cooling pipe.

In order to achieve the above-mentioned object, the present invention provides a method of manufacturing a heat receiving tile formed of carbon fiber composite material used for a high heat load heat receiving equipment, comprising the steps of: providing a heat receiving block formed of carbon fiber composite material and having a through hole, the heat receiving block having a slit extending from a heat receiving surface of the heat receiving block up to the through hole over a full length of the heat receiving block in an axis direction of the through hole; disposing a first thin film brazing material to an inner surface of the through hole; disposing a buffer material to an inside of the first thin film brazing material; disposing a second thin film brazing material to an inside of the buffer material; disposing a cooling pipe to an inside of the second thin film brazing material; and brazing an assembly configured by the heat receiving block, the first thin film brazing material, the buffer material, the second thin film brazing material, and the cooling pipe.

Also, it is preferable that the step of providing the heat receiving block includes a step of forming the slit by making a cut in a material forming the heat receiving block.

Also, it is preferable that a width of the slit of the heat receiving block is set to a value such that the slit of the heat receiving block is closed at least on a side of the heat receiving surface when a brazing processing has been finished, resulting from a deformation of the heat receiving block caused by a difference between a thermal expansion coefficient of the heat receiving block and a thermal expansion coefficient of the cooling pipe in the step of brazing the assembly.

Also, it is preferable that the cooling pipe is formed of a copper alloy material.

Also, it is preferable that the high heat load heat receiving equipment is an equipment used as a first wall of a nuclear fusion device.

Also, it is preferable that the heat receiving block has a fitting groove on an opposite side of the heat receiving surface, wherein a jig is applied for suppressing a deformation of the fitting groove caused by a deformation of the slit in the step of brazing.

Also, it is preferable that the buffer material has a slit extending in the axis direction of the though hole, the buffer material being disposed to the inside of the first thin film brazing material such that the slit of the heat receiving block and the slit of the buffer material coincide with each other.

Advantage of the Invention

The present invention can provide a heat receiving tile formed of carbon fiber composite material used for a high heat load heat receiving equipment such as a first wall of a nuclear fusion device, the heat receiving tile formed of carbon fiber composite material not including a defect to decline a cooling efficiency such as a peeling between members configuring the heat receiving tile and a crack of the members, and a manufacturing method of the same.

DESCRIPTION OF EMBODIMENTS

Hereunder, a heat receiving tile formed of carbon fiber composite material according to an embodiment of the present invention and a method of manufacturing the same will be described referring to the drawings. Note that a heat receiving tile formed of CFC according to this embodiment is used in a high heat load equipment, in particular it is suitable for a divertor in a tokamak type nuclear fusion device.

Figure 1:
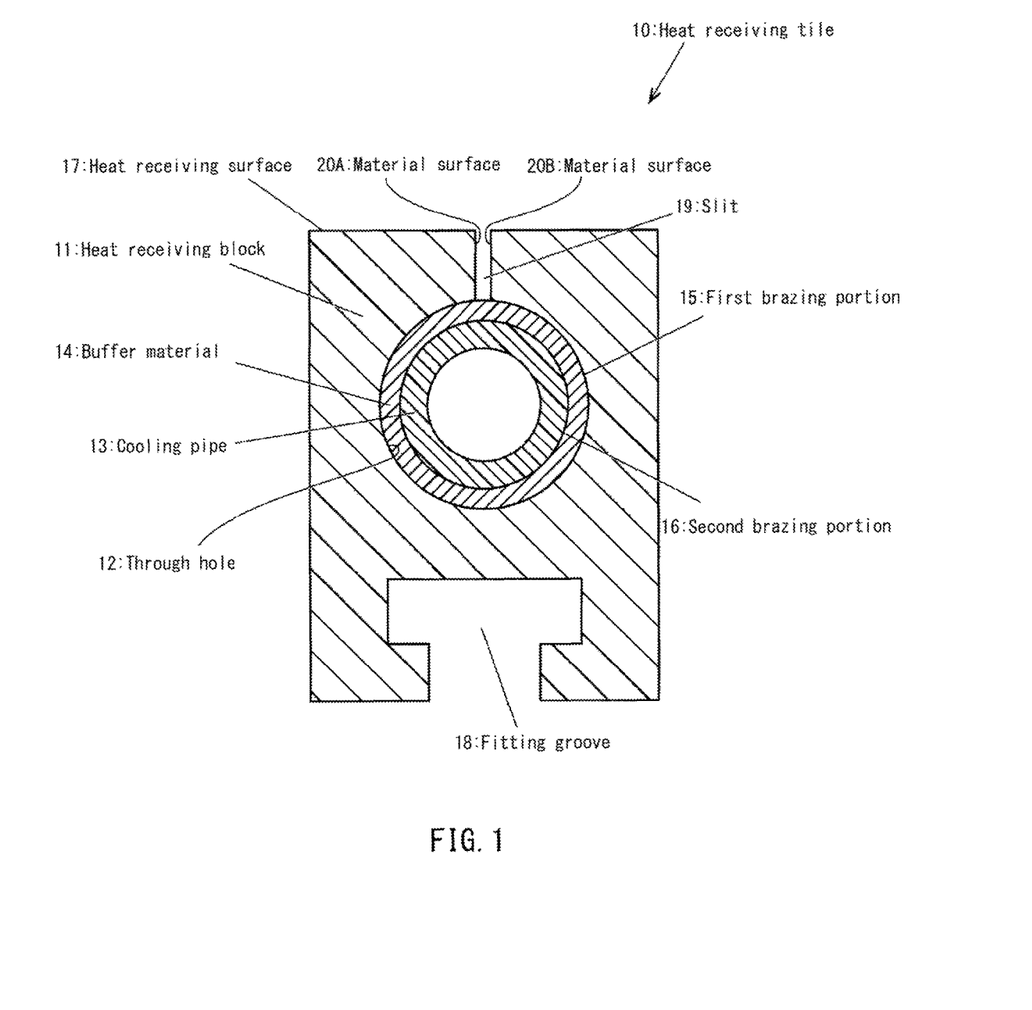
FIG. 1 is a longitudinal section view of a heat receiving tile formed of carbon fiber composite material used for a divertor in a nuclear fusion device according to an embodiment of the present invention.
Figure 2:
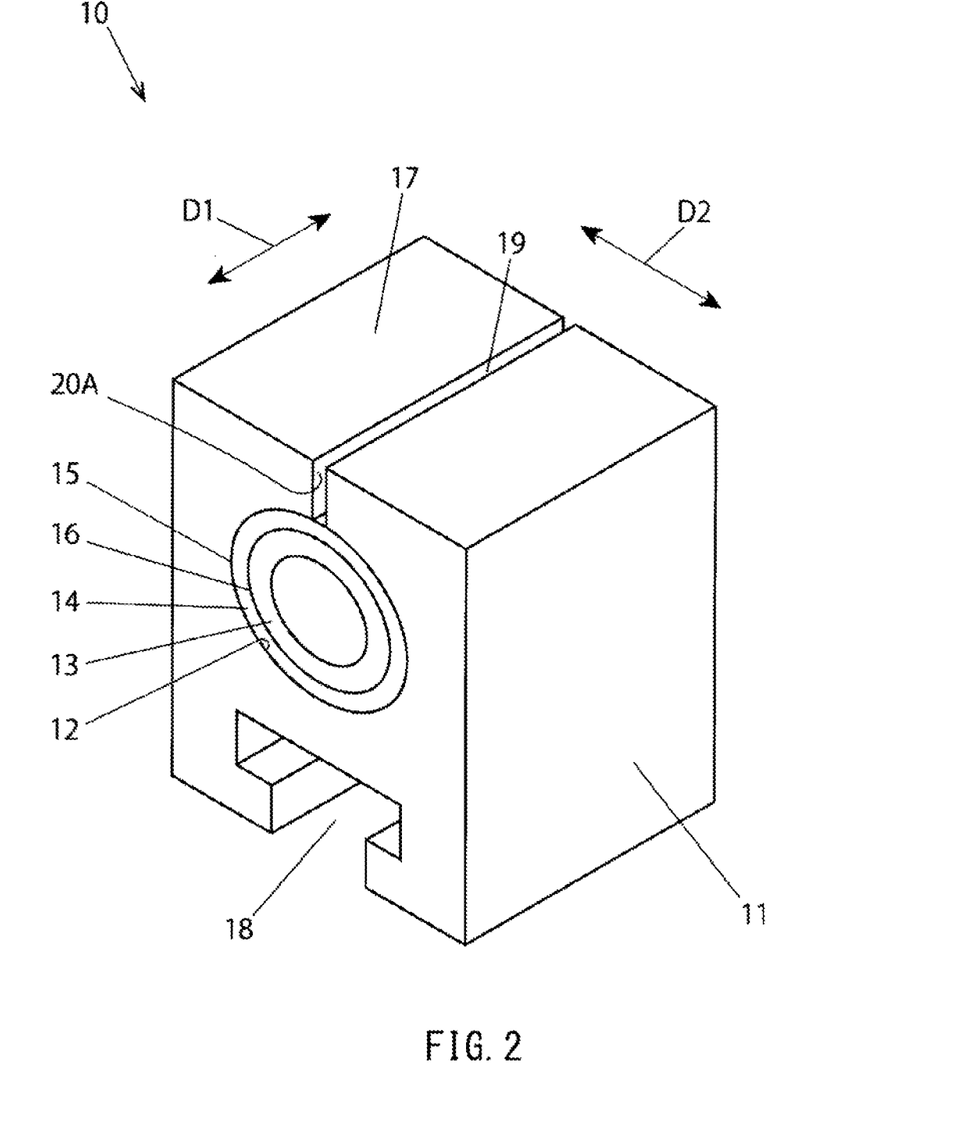
FIG. 2 is a perspective view of the heat receiving tile formed of carbon fiber composite material in FIG. 1.

As illustrated in FIG. 1 and FIG. 2, a heat receiving tile formed of carbon fiber composite material 10 according to this embodiment is formed of a carbon fiber composite material (CFC) and provided with a heat receiving block 11 having a through hole 12. The heat receiving block 11 is generally formed in a substantially rectangular parallelepiped shape.

A cooling pipe 13 is inserted through the through hole 12 of the heat receiving block 11. The cooling pipe 13 is preferably configured by a pipe formed of a copper alloy such as chromium-zirconium copper (CuCrZr), for example, which has high heat conductivity and high strength. The inside of the pipe formed of copper alloy is threaded. A cooling material such as water is made to flow inside the cooling pipe 13 upon operation of the nuclear fusion device, thereby cooling the heat receiving block 11 so as to prevent its heat damage.

A buffer material 14 is provided to the outer surface of the cooling pipe 13. The buffer material 14 is preferably formed of a copper alloy such as an oxygen-free copper or copper tungsten (CuW). The buffer material 14 serves to absorb a thermal expansion difference between the cooling pipe 13 and the heat receiving block 11 to some extent.

A first brazing portion 15 is formed between the inner surface of the through hole 12 of the heat receiving block 11 and the outer surface of the buffer material 14 so as to join them together. Also, a second brazing portion 16 is formed between the inner surface of the buffer material 14 and the outer surface of the cooling pipe 13 so as to join them together. The first brazing portion 15 and the second brazing portion 16 are preferably formed of the Cu—Mg based or Ti—Cu based joining material with high heat conductivity.

Further, the heat receiving tile 10 formed of CFC according to this embodiment has a slit (material discontinuous portion) 19 which extends from a heat receiving surface 17 of the heat receiving block 11 up to the outer surface of the buffer material 14 over the full length of the heat receiving block 11 in an axis direction D1 (FIG. 2) of the through hole 12 of the heat receiving block 11.

The slit 19 is defined by a pair of material surfaces 20A, 20B which are opposed to and separated from each other. The slit 19 is preferably formed in a center portion in a width direction D2 (FIG. 2) orthogonal to the axis direction D1 in the heat receiving surface 17 of the heat receiving block 11.

Figure 3:
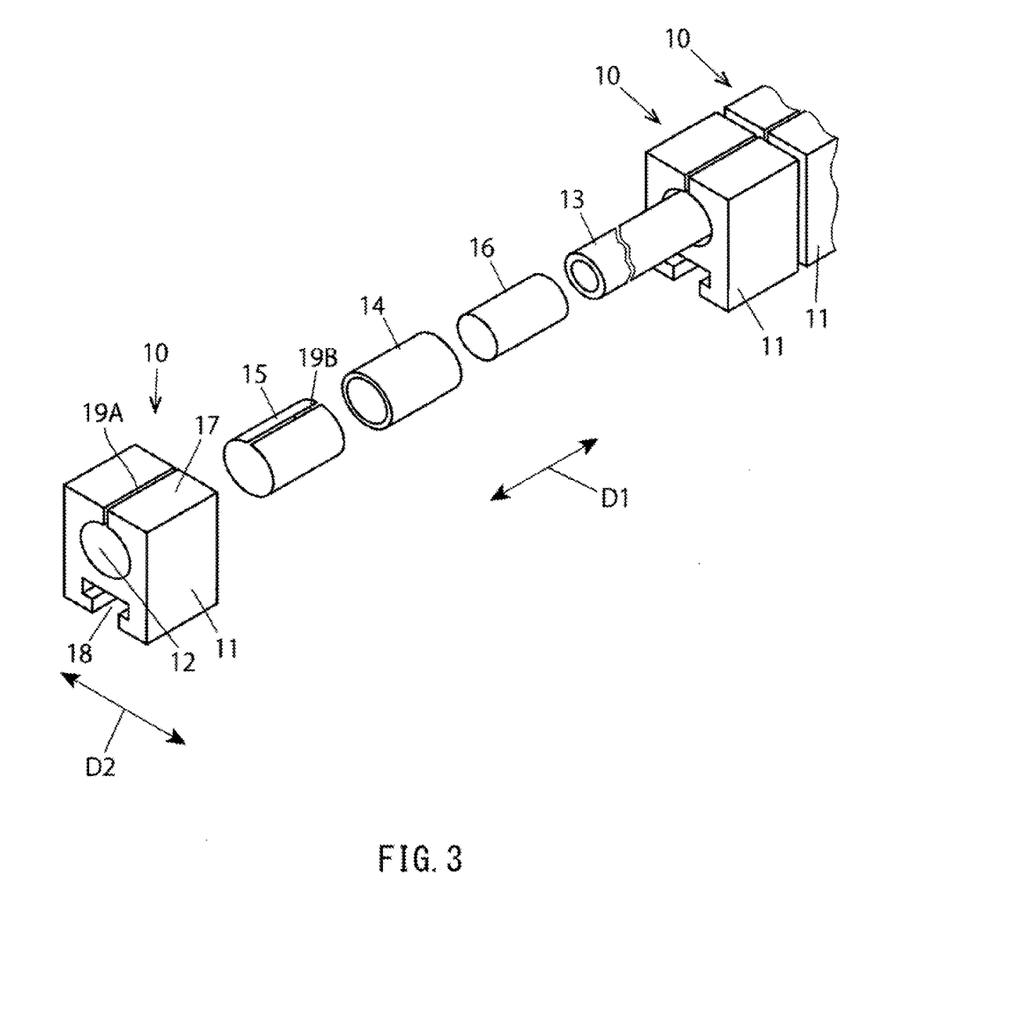
FIG. 3 is an exploded perspective view illustrating a manufacturing method of the heat receiving tile in FIG. 1.

Next, a method of manufacturing the heat receiving tile 10 formed of CFC according to an embodiment of the present invention will be described referring to FIG. 3.

The manufacturing method according to this embodiment is provided with a process of providing the heat receiving block 11 formed of the carbon fiber composite material (CFC) and having the through hole 12. The heat receiving block 11 has a slit 19A which extends from the heat receiving surface 17 up to the through hole 12 of the heat receiving block 11 over the full length of the heat receiving block 11 in the axis direction D1 of the through hole 12. The slit 19A is formed by making a cut in a material which forms the heat receiving block 11.

A first thin film brazing material 15 is disposed inside the through hole 12 of the heat receiving block 11. The first thin film brazing material 15 has a slit 19B extending in the axis direction D1 of the through hole 12, and is disposed such that the slit 19B coincides with the slit 19A of the heat receiving block 11.

A buffer material 14 is disposed inside the first thin film brazing material 15.

A second thin film brazing material 16 is disposed inside the buffer material 14.

A cooling pipe 13 is disposed inside the second thin film brazing material 15. The cooling pipe 13 is disposed so as to penetrate each through hole 12 of a plurality of heat receiving blocks 11.

An assembly configured by the heat receiving block 11, the first thin film brazing material 15, the buffer material 14, the second thin film brazing material 16, and the cooling pipe 13 is vacuum-brazed and applied an aging processing.

At this time, in the conventional heat receiving tile in FIG. 5, the heat receiving block and the buffer material with small thermal expansion coefficient cannot follow the shrinkage of the cooling pipe with large thermal expansion coefficient when the materials shrink in a high temperature processing during the brazing process, especially in a temperature dropping, and therefore defects tend to occur at joining parts between them.

In contrast, in this embodiment, the slits 19A, 19B are formed in the heat receiving block 11 and the first thin film brazing material 15 respectively, and therefore the buffer material 14 joined with the outer surface of the cooling pipe 13 is deformed following the cooling pipe 13 and also the heat receiving block 11 is deformed following the buffer material 14 in the same manner even when the cooling pipe 13 shrinks largely in the temperature dropping.

This enables the difference in thermal expansion coefficient between respective members to be absorbed as a circumferential displacement of each member, thereby enabling prevention of excessive stress occurring in joining surfaces between respective members upon shrinkage of the cooling pipe 13 in the temperature dropping and also enabling prevention of a crack of the heat receiving block 11 in the vicinity of the joining surface and peeling of joining surfaces between respective members.

Thus, degradation of cooling efficiency of the heat receiving tile 10 can be prevented by preventing the peeling of respective members configuring the heat receiving tile 10 and the crack of the members in this manner.

In particular, in the heat receiving tile 10 formed of CFC according to this embodiment, the slit 19 is formed on the side of the heat receiving surface 17 in an operation of the nuclear fusion device, and therefore joining of respective members on the side of the heat receiving surface 17 can be more reliable. Accordingly, a sufficient heat conduction efficiency can be ensured on the side of the heat receiving surface 17 where an especially high cooling efficiency is required, and the heat receiving block 11 can be sufficiently cooled during operation of the nuclear fusion device.

Also, in this embodiment, the inside of the pipe formed of copper alloy configuring the cooling pipe 13 is threaded. Therefore, a pipe wall thickness is larger compared to a non-threaded normal pipe and also the wall thickness is discontinuous, resulting in a shrinking force of the pipe upon brazing being larger and more uneven than a normal piping.

Therefore, brazing becomes more difficult than the normal piping, while a brazing processing can be performed properly even when the inside of the pipe formed of copper alloy configuring the cooling pipe 13 is threaded, by absorbing deformation of each member upon brazing by means of the slit 19 as mentioned above.

Next, a heat receiving tile formed of CFC according to another embodiment of the present invention and a manufacturing method of the same will be described referring to FIG. 4.

Figure 4:
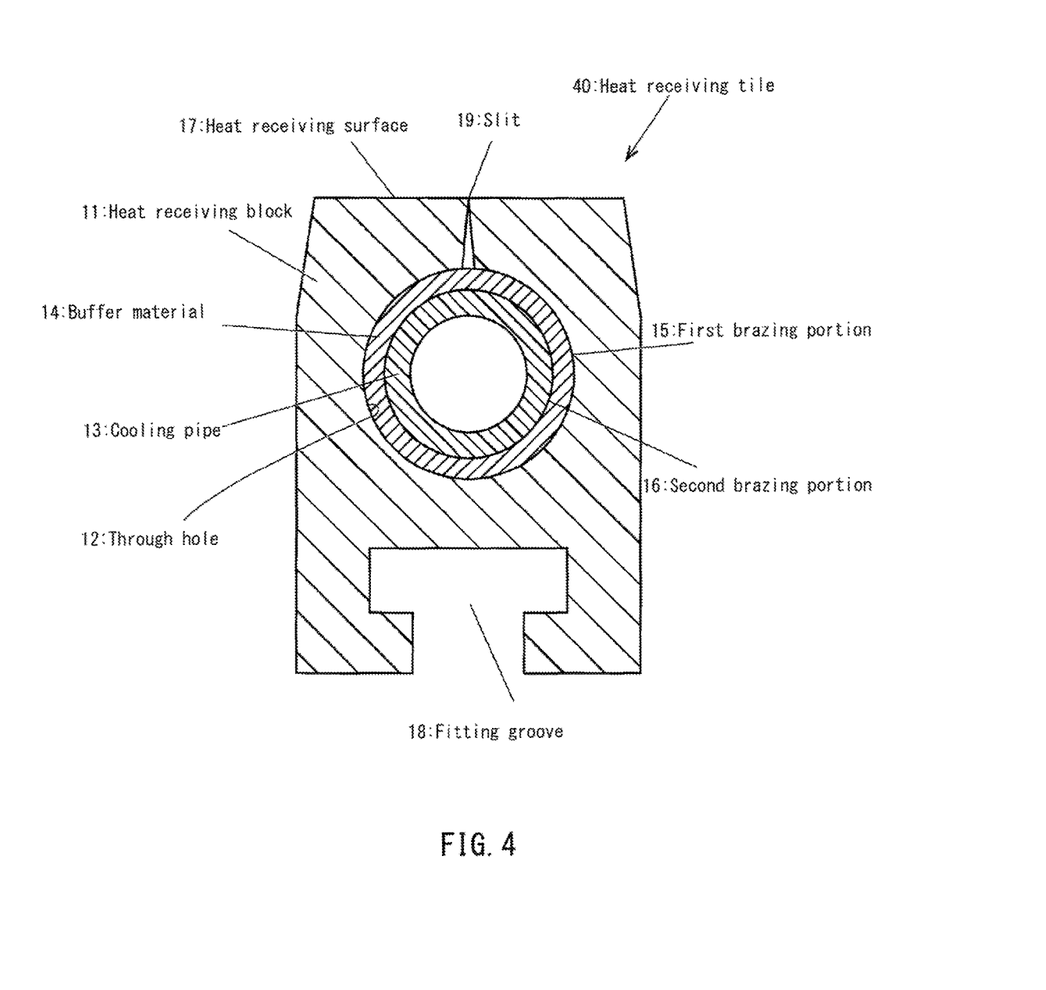
FIG. 4 is a longitudinal section view of a heat receiving tile formed of carbon fiber composite material used for a divertor in a nuclear fusion device according to another embodiment of the present invention.

As illustrated in FIG. 4, in a heat receiving tile 40 formed of CFC according to this embodiment, its slit 19 is closed on the side of the heat receiving surface 17 of the heat receiving block 11.

In a manufacturing method of the heat receiving tile 40 according to this embodiment, a width of the slit 19A (FIG. 3) of the heat receiving block 11 before the brazing processing is set to a value that the slit 19 of the heat receiving block 11 is closed at least on the side of the heat receiving surface 17 when the brazing processing has been finished, resulting from deformation of the heat receiving block 11 caused by the difference between the thermal expansion coefficient of the heat receiving block 11 and the thermal expansion coefficient of the cooling pipe 13 in the process of vacuum-brazing and applying an aging processing to the assembly configured by the heat receiving block 11, and the like.

Namely, the cooling pipe 13 expanded in the high temperature processing in brazing shrinks largely in the temperature dropping after that, while the heat receiving block 11 formed of CFC has a smaller shrinkage compared to the cooling pipe 13. A stress works on the heat receiving block 11 resulting from the difference in shrinkage between the both and the heat receiving block 11 is thereby deformed in a direction of closing the slit 19 on the side of the heat receiving surface 17 as illustrated in FIG. 4.

Thus, a width of a slit 19A of the heat receiving block 11 before the brazing processing is set such that the width of the slit 19A disappears in completion on the side of the heat receiving surface 17, considering a deformation amount of the heat receiving block 11 in the temperature dropping.

According to this embodiment, the slit 19 of the completed heat receiving tile 40 is closed on the side of the heat receiving surface 17 of the heat receiving block 11, and therefore a heat radiation in an operation of the nuclear fusion device can be surely prevented from directly reaching the cooling pipe 13 via the slit 19.

Also, closing of the slit 19 in the brazing processing induces a deformation of the fitting groove 18 disposed on the opposite side of the slit 19, which will be addressed by applying a jig for fixing a width of the subject portion and a carbon sheet as a buffer material, which is softer and more deformable than a material, between the jig and a product.

As a variation of each embodiment above, a slit can be formed in the buffer material 14 as well corresponding to the slit 19 of the heat receiving block 11. Namely, in this variation, the buffer material 14 has a slit extending in the axis direction of the through hole 12 of the heat receiving block 11, and the slit of the buffer material 14 and the slit 19 of the heat receiving block 11 coincide with each other.

Note that, although the heat receiving tile suitable for the divertor configuring the first wall of the Tokamak type nuclear fusion device is described in each embodiment and its variation above, the heat receiving tile formed of CFC according to the present invention is not limited to the application for the first wall of the nuclear fusion device and can also be broadly applied to a heat receiving tile which is formed by metallurgically joining a cooling pipe to a heat receiving block formed of CFC.

DESCRIPTION OF REFERENCE NUMERALS 10, 40 . . . heat receiving tile formed of CFC
11 . . . heat receiving block
12 . . . through hole
13 . . . cooling pipe
14 . . . buffer material
15 . . . first brazing portion (first brazing thin film)
16 . . . second brazing portion (second brazing thin film)
17 . . . heat receiving surface
18 . . . fitting groove
19, 19A, 19B . . . slit (material discontinuous portion)
20A, 20B . . . material surface

The invention claimed is:

1. A heat receiving tile formed of carbon fiber composite material used for a high heat load heat receiving equipment, comprising:
    a heat receiving block formed of a carbon fiber composite material and having a through hole;
    a cooling pipe inserted through the through hole of the heat receiving block;
    a buffer material provided to an outer periphery of the cooling pipe;
    a first brazing portion joining an inner surface of the through hole with an outer surface of the buffer material;
    a second brazing portion joining an inner surface of the buffer material with an outer surface of the cooling pipe; and
    a material discontinuous portion extending from a heat receiving surface of the heat receiving block up to at least the outer surface of the buffer material over a full length of the heat receiving block in an axis direction of the through hole,
    wherein the material discontinuous portion is defined by a pair of material surfaces opposed to each other, and the pair of material surfaces is in contact with each other at least on a side of the heat receiving surface.

2. The heat receiving tile formed of carbon fiber composite material according to claim 1, wherein the material discontinuous portion is formed by making a cut in the heat receiving block in a process of manufacturing the heat receiving tile.

3. The heat receiving tile formed of carbon fiber composite material according to claim 1, wherein the cooling pipe is formed of a copper alloy material.

4. The heat receiving tile formed of carbon fiber composite material according to claim 1, wherein the high heat load heat receiving equipment is an equipment used as a first wall of a nuclear fusion device.

5. The heat receiving tile formed of carbon fiber composite material according to claim 1, wherein the material discontinuous portion extends from the heat receiving surface of the heat receiving block up to the outer surface of the cooling pipe.

6. A method of manufacturing a heat receiving tile formed of carbon fiber composite material used for a high heat load heat receiving equipment comprising the steps of:
    providing a heat receiving block formed of a carbon fiber composite material and having a through hole, the heat receiving block having a slit extending from a heat receiving surface of the heat receiving block up to the through hole over a full length of the heat receiving block in an axis direction of the through hole;

disposing a first thin film brazing material on an inner surface of the through hole;

disposing a buffer material on an inside of the first thin film brazing material;

disposing a second thin film brazing material on an inside of the buffer material;

disposing a cooling pipe to an inside of the second thin film brazing material; and brazing an assembly configured by the heat receiving block, the first thin film brazing material, the buffer material, the second thin film brazing material, and the cooling pipe, wherein a width of the slit of the heat receiving block is set to a value such that the slit of the heat receiving block is closed at least on a side of the heat receiving surface when a brazing processing has been finished, resulting from a deformation of the heat receiving block caused by a difference between a thermal expansion coefficient of the heat receiving block and a thermal expansion coefficient of the cooling pipe in the step of brazing the assembly.

7. The method of manufacturing a heat receiving tile formed of carbon fiber composite material according to claim 6, wherein the step of providing the heat receiving block includes a step of forming the slit by making a cut in a material forming the heat receiving block.

8. The method of manufacturing a heat receiving tile formed of carbon fiber composite material according to claim 6, wherein the cooling pipe is formed of a copper alloy material.

9. The method of manufacturing a heat receiving tile formed of carbon fiber composite material according to claim 6, wherein the high heat load heat receiving equipment is an equipment used as a first wall of a nuclear fusion device.

10. The method of manufacturing a heat receiving tile formed of carbon fiber composite material according to claim 6, wherein the heat receiving block has a fitting groove on an opposite side of the heat receiving surface, and wherein a jig is applied for suppressing a deformation of the fitting groove caused by a deformation of the slit in the step of brazing.

11. The method of manufacturing a heat receiving tile formed of carbon fiber composite material according to claim 6, wherein the buffer material has a slit extending in the axis direction of the though hole, the buffer material being disposed on the inside of the first thin film brazing material such that the slit of the heat receiving block and the slit of the buffer material coincide with each other.

* * * * *